United States Patent
Fukuzawa et al.

(10) Patent No.: US 11,873,863 B2
(45) Date of Patent: Jan. 16, 2024

(54) INSULATING ROLLING BEARING

(71) Applicant: NTN CORPORATION, Osaka (JP)

(72) Inventors: Satoru Fukuzawa, Mie (JP); Masato Shimoda, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/762,706

(22) PCT Filed: Sep. 9, 2020

(86) PCT No.: PCT/JP2020/034063
§ 371 (c)(1),
(2) Date: Mar. 22, 2022

(87) PCT Pub. No.: WO2021/065391
PCT Pub. Date: Apr. 8, 2021

(65) Prior Publication Data
US 2022/0341464 A1    Oct. 27, 2022

(30) Foreign Application Priority Data

Sep. 30, 2019   (JP) ................................ 2019-179197
Mar. 12, 2020   (JP) ................................ 2020-042655

(51) Int. Cl.
*F16C 19/06*   (2006.01)
*F16C 33/58*   (2006.01)
(Continued)

(52) U.S. Cl.
CPC ............. *F16C 33/58* (2013.01); *F16C 19/06* (2013.01); *F16C 35/073* (2013.01); *F16C 35/077* (2013.01); *F04C 2240/50* (2013.01)

(58) Field of Classification Search
CPC ........ F16C 19/06; F16C 19/52; F16C 33/203; F16C 33/205; F16C 33/206; F16C 33/208;
(Continued)

(56) References Cited

U.S. PATENT DOCUMENTS 4,997,293 A * 3/1991 Ono ..................... F16C 35/077
                                                    384/476
5,961,222 A * 10/1999 Yabe .................... F16C 33/586
                                                    384/477

(Continued)

FOREIGN PATENT DOCUMENTS

CN       104321550 A *   1/2015    ............. F04B 1/141
CN       107795455 A     3/2018
(Continued)

OTHER PUBLICATIONS

DE102013225541_translation.*
(Continued)

*Primary Examiner* — Phillip A Johnson
(74) *Attorney, Agent, or Firm* — Hedman & Costigan, P.C.; James V. Costigan; Kathleen A. Costigan

(57) ABSTRACT

To provide an insulating rolling bearing that is capable of preventing electrolytic corrosion and preventing a gap from being undesirably formed between a shaft and a raceway ring. A sub bearing 21 includes an inner ring 22, an outer ring 23, balls 24 interposed between the inner ring and the outer ring, and an insulating bushing 28 fitted to an inner peripheral portion of the inner ring 22. The insulating bushing 28 includes a generally cylindrical metal base 28a, and a resin layer 28b formed on an inner peripheral surface of the metal base 28a. The insulating bushing 28 is fitted to (Continued)

the inner peripheral portion of the inner ring 22 such that the metal base 28a abuts on the inner peripheral portion of the inner ring 22.

10 Claims, 6 Drawing Sheets

(51) Int. Cl.
*F16C 35/07* (2006.01)
*F16C 35/073* (2006.01)
*F16C 35/077* (2006.01)

(58) Field of Classification Search
CPC ...... F16C 33/58; F16C 35/073; F16C 35/077; F04C 2240/50; H02K 5/173; H02K 5/1732
See application file for complete search history.

(56) References Cited

U.S. PATENT DOCUMENTS

| 6,390,683 | B1 * | 5/2002 | Hirose | F16C 19/525 384/277 |
| 2018/0066700 | A1 * | 3/2018 | Kozuma | F25B 31/002 |

FOREIGN PATENT DOCUMENTS

| DE | 102013225341 | A1 * | 6/2015 | ............ F16C 35/073 |
| EP | 3290711 | A1 | 3/2018 | |
| JP | 55-010111 | A | 1/1980 | |
| JP | 06-074240 | A | 3/1994 | |
| JP | 2002-295483 | A | 10/2002 | |
| JP | 2004-263836 | A | 9/2004 | |
| JP | 2006-250347 | A | 9/2006 | |
| JP | 3868529 | B2 * | 1/2007 | ............ F16C 35/073 |
| JP | 2007-292119 | A | 11/2007 | |
| JP | 2014-224502 | A | 12/2014 | |
| JP | 2018-040261 | A | 3/2018 | |
| JP | 2019-094976 | A | 6/2019 | |
| WO | 2014/185308 | A1 | 11/2014 | |

OTHER PUBLICATIONS

JP_3868529_B2.*
CN_104321550_A.*
Machine translation of JP 2018-040261A dated Mar. 15, 2018.
Machine translation of JP 2004-263836A dated Sep. 24, 2004.
Machine translation of JP 2002-295483A dated Oct. 9, 2002.
Machine translation of JP 2019-094976A dated Jun. 20, 2019.
Machine translation of JP 2007-292119A dated Nov. 8, 2007.
Machine translation of JP 2006-250347A dated Sep. 21, 2006.
Machine translation of JP 06-074240A dated Mar. 15, 1994.
Machine translation of JP 2014-224502A dated Dec. 4, 2014.
Machine translation of JP 55-010111A dated Jan. 24, 1980.
Machine translation of JP 107795455A dated Mar. 13, 2018.

* cited by examiner

INSULATING ROLLING BEARING

TECHNICAL FIELD

The present invention relates to an insulating rolling bearing, in particular, an insulating rolling bearing used in a refrigerant compressor.

BACKGROUND ART

Displacement refrigerant compressors have been utilized in various fields as compressors for refrigeration and air conditioning equipment. In recent years, the interest of energy reducing has been increasing, and the efficiency improvement has been required in various industries. In particular, in an air handling unit relating to a living environment, the development of highly reliable products capable of achieving low cost and high efficiency is demanded because the public opinion focuses thereon. Accordingly, a refrigerant compressor that drives a motor by a variable speed control using an inverter has been increased, and thus the high efficiency has been improved from the conventional constant-speed drive type refrigerant compressor.

In the refrigerant compressor using the inverter, the driving current (input current from the inverter to the motor) becomes large under high load driving, compared to the conventional constant-speed drive type refrigerant compressor. Thus, the voltage (shaft voltage) generated on a crank shaft that rotates integrally with the motor is apt to increase. The potential difference between an inner ring and an outer ring of a rolling bearing that supports the crank shaft becomes larger due to the increase of the shaft voltage. As a result, the current in the rolling bearing becomes larger. This current causes corrosion, which is called electrolytic corrosion, on raceway surfaces of the inner ring and the outer ring, and on rolling surfaces of rolling elements of the rolling bearing, so that the reliability of the refrigerant compressor is deteriorated.

Patent document 1 discloses a conventional refrigerant compressor that prevents such electrolytic corrosion. In this refrigerant compressor, an insulating sleeve that is formed of insulating material is disposed between a sub bearing that rotatably supports a sub shaft at a side opposite to a compression mechanism relative to a driving mechanism of a crank shaft, and the crank shaft. With this, electrolytic corrosion of the bearing is prevented and damage of the bearing due to the electrolytic corrosion or lubrication oil shortage is suppressed by a low cost structure, so that the reliability of the refrigerant compressor is improved.

Also, as rolling bearings that take an electrolytic corrosion countermeasures, a rolling bearing in which conductive grease is filled (see Patent Document 2) and a rolling bearing in which an insulating film is disposed directly on a raceway ring (see Patent Document 3) have been known.

PRIOR ART DOCUMENTS

Patent Documents

Patent Document 1: JP 2018-040261 A
Patent Document 2: JP 2004-263836 A
Patent Document 3: JP 2002-295483 A

SUMMERY OF THE INVENTION

Problems to be Solved by the Invention

In the refrigerant compressor disclosed in Patent document 1, the insulating sleeve is fitted into an inner diametrical side of the inner ring by means of press-fitting or the like. However, since the insulating sleeve and the crank shaft rotate relative to each other and the insulating sleeve and the inner ring rotate relative to each other, the wear is caused on the insulating sleeve easily. As a result, a gap is undesirably formed between the crank shaft and the inner ring, and thus vibration of the compressor or abnormal noise might be caused.

Further, in the refrigerant compressor, the rolling bearing is used within a liquid refrigerant in which refrigerator oil and refrigerant are mixed. Thus, in the rolling bearing disclosed in Patent Document 2, the conductive grease flows out so that the electrolytic corrosion preventive effect might be deteriorated.

Further, in the rolling bearing disclosed in Patent Document 3, the insulating film formed of synthetic resin is formed on a non-raceway surface of the outer ring or the inner ring by means of injection molding. In the injection molding, melted resin is injected by high pressure and is contracted through cooling and solidifying, so that the shape of the raceway surface that is high-accurately formed might be deteriorated. Thus, it is necessary to enlarge the thickness of the raceway ring at the side on which the insulating film is formed. As a result, it is difficult to downsize the device.

An object of the present invention is, in order to solve such problems, to provide an insulating rolling bearing that is capable of preventing electrolytic corrosion and preventing a gap from being undesirably formed between a shaft and a raceway ring.

Means for Solving the Problem

An insulating rolling bearing according to the present invention includes: an inner ring; an outer ring; rolling elements that are interposed between the inner ring and the outer ring; and an insulating bushing that is fitted to an inner peripheral portion of the inner ring or an outer peripheral portion of the outer ring. The insulating bushing includes a generally cylindrical metal base, and a resin layer formed on an inner peripheral surface or an outer peripheral surface of the metal base. The insulating bushing is fitted to the inner peripheral portion of the inner ring or the outer peripheral portion of the outer ring such that the metal base abuts on the inner peripheral portion of the inner ring or the outer peripheral portion of the outer ring.

The insulating bushing may be a rolled bushing having one cut part in a circumferential direction.

A base resin of the resin layer may be a polytetrafluoroethylene (PTFE) resin. Further, the resin layer may contain 10 to 30 mass % of glass fiber relative to a whole of the resin layer.

The resin layer may be an injection-molded layer formed on the inner peripheral surface of the metal base, and the insulating bushing may be fitted to the inner peripheral portion of the inner ring such that the metal base abuts on the inner peripheral portion of the inner ring.

A base resin of the resin layer may be a polyphenylene sulfide (PPS) resin, a polyether ketone (PEK)-based resin, a tetrafluoroethylene-perfluoroalkyl vinyl ether copolymer (PFA) resin, a tetrafluoroethylene-hexafluoropropylene copolymer (FEP) resin, or a tetrafluoroethylene-ethylene copolymer (ETFE) resin.

A bonding surface of the metal base to the resin layer may be subjected to a chemical surface treatment that enhances adhering force of the resin layer.

The chemical surface treatment may form a fine unevenness on the bonding surface or form a bonding film, which chemically reacts with the resin layer, on the bonding surface.

The insulating rolling bearing may be configured to be used as a bearing in a refrigerant compressor to rotatably support a shaft rotationally driven by a motor of the refrigerant compressor. Further, the refrigerant compressor may be a scroll type refrigerant compressor.

Effect of the Invention

The insulating rolling bearing according to the present invention comprises: the inner ring; the outer ring; the rolling elements; and the insulating bushing that is fitted to the inner peripheral portion of the inner ring or the outer peripheral portion of the outer ring. Further, the insulating bushing includes the metal base, and the resin layer formed on a surface of the metal base. Further, the insulating bushing is fitted to the inner peripheral portion of the inner ring or the outer peripheral portion of the outer ring such that the metal base abuts on the inner peripheral portion of the inner ring or the outer peripheral portion of the outer ring. In this case, a surface of the insulating bushing that abuts on a non-raceway surface of the outer ring or the inner ring is formed of metal and a non-contact surface of the insulating bushing is formed of resin. Accordingly, shaft current is prevented from flowing into a bearing body, and thus electrolytic corrosion can be prevented. Further, since the bearing body and the insulating bushing are fitted and integrated with each other, the insulating bushing is prevented from rotating (sliding) relative to the bearing body or the shaft, so that wear of the insulating bushing can be prevented. As a result, a gap is prevented from being undesirably formed between the bearing body and the shaft, and for example in a case in which the insulating rolling bearing is used in the refrigerant compressor, vibration of the compressor and abnormal noise can be prevented.

Further, according to the insulating rolling bearing of the present invention, since it is not necessary to enlarge the thickness of the raceway ring, the device can be downsized. Also, since it is not necessary to adopt a rolling bearing with conductive grease filled therein, the damage of the bearing due to electrolytic corrosion or lubrication oil shortage can be suppressed by a low cost structure, so that the reliability of the refrigerant compressor can be improved.

The base resin of the resin layer is the PTFE resin, and thereby the insulating rolling bearing is superior in heat resistance and chemical resistance. Further, the resin layer contains 10 to 30 mass % of glass fiber relative to a whole of the resin layer, and thereby the creep resistance can be also improved.

In the insulating bushing, the resin layer is an injection-molded layer formed on the inner peripheral surface of the metal base, and the insulating bushing is fitted to the inner peripheral portion of the inner ring such that the metal base abuts on the inner peripheral portion of the inner ring. Accordingly, the resin layer bites the rough surface of the metal base, and thus the bonding area is increased and the adhering strength between the resin layer and the metal base can be secured. Further, the injection-molded layer is formed not directly on a non-raceway ring of the inner ring but on the metal base, which is a different component from the inner ring, so that the dimensional accuracy of the inner ring (raceway ring) can be maintained.

Since the base resin of the resin layer is the PPS resin, the PEK-based resin, the PFA resin, the FEP resin or the ETFE resin, the resin layer is superior in heat resistance and chemical resistance.

The bonding surface of the metal base to the resin layer is subjected to a chemical surface treatment that enhances adhering force of the resin layer, specifically, a treatment that forms a fine unevenness on the bonding surface or forms a bonding film, which chemically reacts with the resin layer, on the bonding surface. Accordingly, the adhering strength between the resin layer and the metal base is enhanced, and thus the resin layer is prevented from peeling from the metal base even in the use under a high load.

MODE FOR CARRYING OUT THE INVENTION

Figure 1:
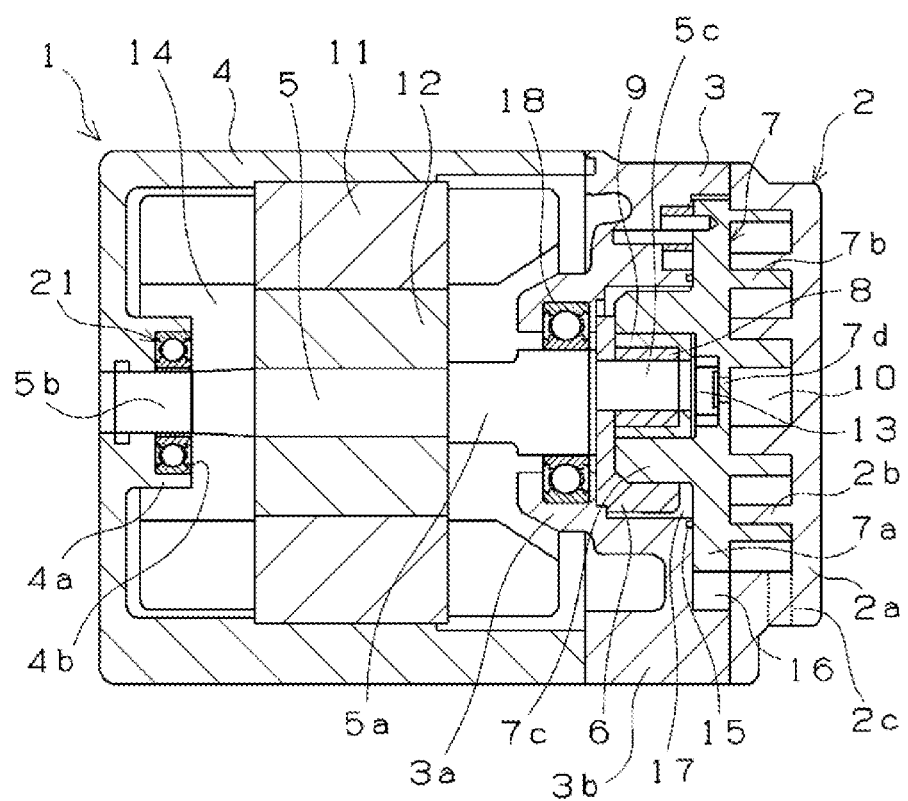
FIG. 1 is a sectional view illustrating one example of a refrigerant compressor using an insulating rolling bearing of the present invention.

A refrigerant compressor having an insulating rolling bearing of the present invention is described with reference to FIG. 1. FIG. 1 is a sectional view of the refrigerant compressor. In the example shown in FIG. 1, a displacement scroll compressor is shown as the refrigerant compressor, however the refrigerant compressor to which the insulating rolling bearing of the present invention is applied is not limited to the scroll type compressor, and thus the insulating rolling bearing of the present invention can be applied to displacement compressors having other types of compression mechanisms such as a rotary type compressor, a reciprocating type compressor and a screw type compressor. Further, the insulating rolling bearing of the present invention can be applied to any of a horizontal refrigerant compressor and a vertical refrigerant compressor.

As shown in FIG. 1, a compressor 1 has a housing formed by a fixed scroll 2, a center housing 3, and a motor housing 4. The center housing 3 and the motor housing 4 rotatably support a metal shaft 5, which is a rotational shaft, via a main bearing 18 and a sub bearing 21. A balance weight 6 is mounted to the shaft 5. Thus, a rotational member is formed by the shaft 5 and the balance weight 6.

The center housing 3 has a bearing support part 3*a* into which the main bearing 18 formed by a rolling bearing is installed, and a support part 3*b* that extends radially outward from the bearing support part 3*a* and fixes the fixed scroll 2. The main bearing 18 is fitted into a through hole formed at the center of the bearing support part 3*a*.

The fixed scroll 2 has a base plate 2*a* and a scroll lap 2*b* disposed to vertically extend from the base plate 2*a*. Further, an inlet port 2*c* is disposed on an outer peripheral portion of the fixed scroll 2. A movable scroll 7 has a base plate 7a, a scroll lap 7b disposed to vertically extends from the base plate 7a, and a discharge port 7d at the center portion thereof. Further, the movable scroll 7 has a boss part 7c disposed at the center portion of the base plate 7a at a side opposite to the scroll lap 7b. The boss part 7c is disposed to vertically extend from the base plate 7a. A slewing bearing 8, which is formed by a sliding bearing, is press-fitted into the boss part 7c.

The fixed scroll 2 and the movable scroll 7 are meshed with each other to form a compression chamber 10. When the movable scroll 7 is slewed, a compression action that reduces the volume of the compression chamber 10 is performed. Refrigerant gas in a refrigerating cycle is introduced into the compression chamber 10 via an inlet pipe (not shown) and the inlet port 2c in response to the slewing motion of the movable scroll 7.

The refrigerant gas sucked into the compression chamber 10 is discharged from the discharge port 7d to a discharge chamber 13 after the compression stroke, and then the refrigerant gas flows through a fluid passage (not shown) to a motor chamber 14. The compressed refrigerant gas that has flown into the motor chamber 14 flows out through a discharge pipe (not shown) to the refrigerating cycle.

A stator 11, which is a stator, is fixed to an inner peripheral surface of the motor housing 4. A rotor 12, which is a rotor, is fixed to an outer peripheral surface of the shaft 5 to face the stator 11. The stator 11 and the rotor 12 form a motor, and thus when the stator 11 is energized, the rotor 12 and the shaft 5 are integrally rotated.

The shaft 5 is provided with a main shaft part 5a that is rotatably supported by the main bearing 18, a sub shaft part 5b that is rotatably supported by the sub bearing 21, an eccentric shaft part 5c that is disposed on an end portion of the main shaft part 5a and is supported by the slewing bearing 8 of the movable scroll 7, and the like. The main shaft part 5a and the sub shaft part 5b are disposed coaxially with each other, and the eccentric shaft part 5c is disposed to be eccentric to the main shaft part 5a. The eccentric shaft part 5c is rotatably supported by the slewing bearing 8 via a sleeve 9. An inner peripheral surface of the slewing bearing 8 serves as a sliding contact surface with an outer peripheral surface of the eccentric shaft part 5c.

The reference sign 15 in FIG. 1 represents a seal ring disposed in a groove of the center housing 3 that faces the base plate 7a of the movable scroll 7. A low pressure chamber 16 of which pressure is closer to the sucking pressure is disposed at an outer side relative to the seal ring 15. A space 17 is kept in an intermediate pressure state of which pressure is lower than that in a high pressure region (the motor chamber 14 and the discharge chamber 13) and higher than that in the low pressure chamber 16 by a pressure adjustment using a control valve, or leak of the refrigerant gas from the high pressure region via small gaps between the main bearing 18 and the shaft 5 and between the slewing bearing 8 and the shaft 5. A region (the space 17) of which pressure is lower than that in the high pressure region is formed at a back side of the movable scroll 7, so that a load caused by the pressure applied to the back surface of the movable scroll 7 and applied to the movable scroll 7 at the side of the fixed scroll 2 is reduced. Thus, smooth rotation of the movable scroll 7 can be realized and mechanical loss of the movable scroll 7 can be reduced.

The main bearing 18 is formed by a ball bearing, which is the kind of the rolling bearing, and is disposed at the side of the compression mechanism relative to the motor for the shaft 5. A roller bearing may be also adopted as the main bearing 18. The sub bearing 21 is formed by a ball bearing, which is the kind of the rolling bearing, and is disposed at the side opposite to the compression mechanism relative to the motor.

The sub bearing 21 is disposed within a bearing support part 4a of the motor housing 4. Specifically, the bearing support part 4a has an opening 4b disposed at aside of the motor so as to allow the sub bearing 21 to be inserted therein. The sub bearing 21 is inserted into the opening 4b. A cover that covers the opening 4b may be further disposed.

Figure 2:
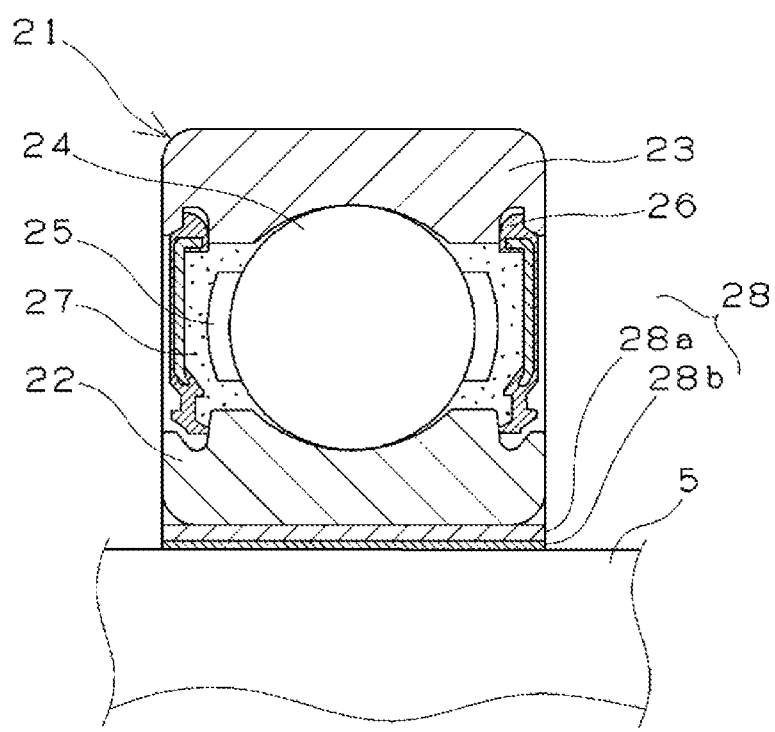
FIG. 2 is an enlarged sectional view of the insulating rolling bearing in FIG. 1.

An insulating rolling bearing serving as the sub bearing 21 shown in FIG. 1 is now described with reference to FIG. 2. As shown in FIG. 2, the sub bearing 21 includes a bearing body that has an inner ring 22 and an outer ring 23 each serving as a raceway ring, and a plurality of balls (rolling elements) 24 interposed between the inner ring and the outer ring, and an insulating bushing 28 fitted into an inner peripheral portion of the inner ring 22. The balls 24 are held by a cage 25 to be aligned at the same intervals. A bearing space around the balls 24 is filled with grease 27. The bearing space is sealed by a sealing member 26. Each of the inner ring 22, the outer ring 23 and the balls 24 is formed of bearing steel such as SUJ2.

In the example shown in FIG. 2, a metal base 28a of the insulating bushing 28 is press-fitted to abut on the inner peripheral portion of the inner ring 22 at the side opposite to the raceway side. The insulating bushing 28 is formed by the metal base 28a at its outer diametrical side and a resin layer 28b at its inner diametrical side. The inner ring 22 and the insulating bushing 28 are integrated by not using an adhesive but using press-fitting. When the insulating bushing 28 is press-fitted and the shaft 5 is inserted into a shaft hole of the insulating bushing 28, the shaft 5, the insulating bushing 28 and the inner ring 22 become rotatable integrally with each other. When the shaft 5 is rotating, the resin layer 28b gets into contact with the outer peripheral surface of the shaft 5 without sliding. Further as shown in FIG. 2, the resin layer 28b is interposed between the inner ring 22 and the metal base 28a, and the shaft 5, so that the shaft current is prevented from flowing in the bearing body.

Figure 3:
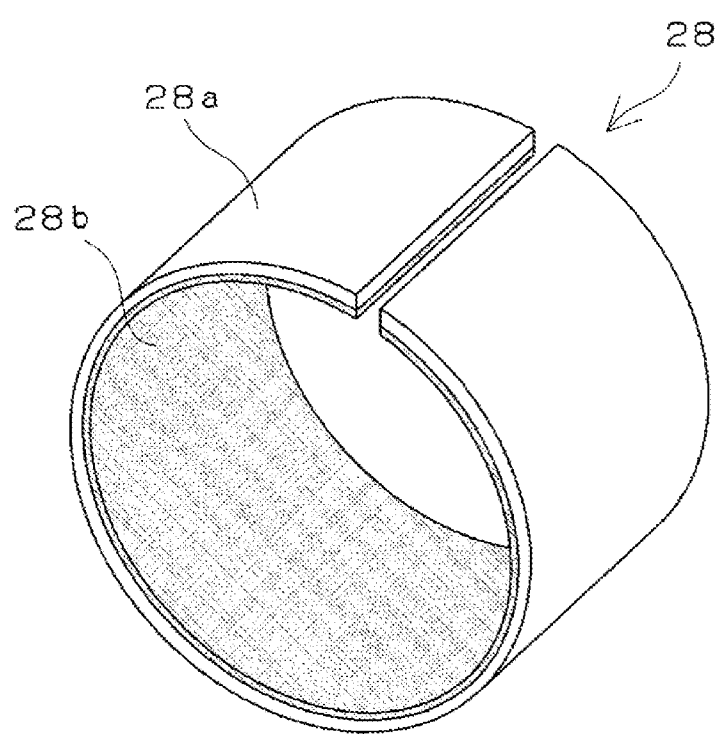
FIG. 3 is a perspective view illustrating one example of an insulating bushing of the insulating rolling bearing of the present invention.

FIG. 3 is a perspective view illustrating one example of the insulating bushing. As shown in FIG. 3, the insulating bushing 28 is a generally cylindrical member having one cut part (abutment) in its circumferential direction. The insulating bushing 28 has the metal base 28a having a generally cylindrical shape, and the resin layer 28b formed on an inner peripheral surface of the metal base 28a.

Figure 4:
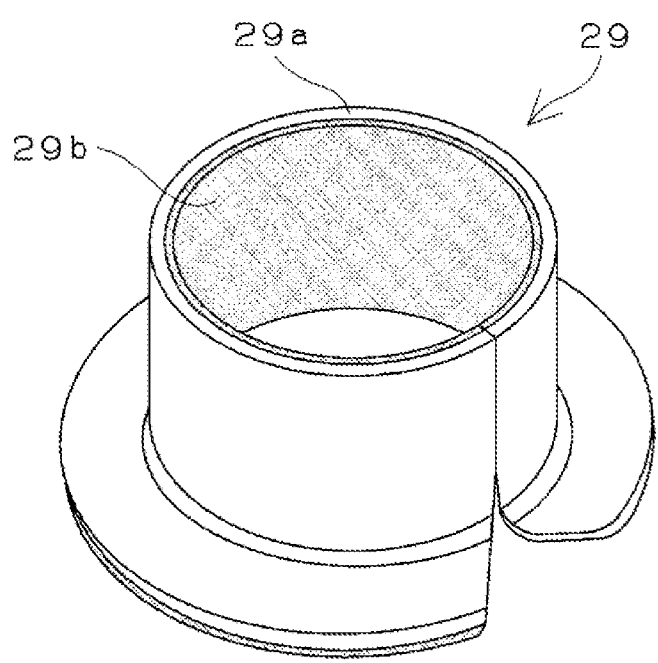
FIG. 4 is a perspective view illustrating another example of an insulating bushing of the insulating rolling bearing of the present invention.

Further, FIG. 4 shows another example of the insulating bushing having one cut part in its circumferential direction. An insulating bushing 29 shown in FIG. 4 has a cylindrical metal base 29a with flange, and a resin layer 29b disposed on an inner peripheral surface of the metal base 29a. When the insulating bushing 29 is fitted into the inner peripheral portion of the inner ring, the flange is fitted to a width surface of the inner ring so that the metal base 29a abuts on the width surface.

The thickness of each of the metal base and the resin layer is not especially limited, however it is preferable that the thickness of the metal base is larger than the thickness of the resin layer. The thickness of the metal base is preferably set in a range of 0.5 to 5 mm, more preferably a range of 1 to 3 mm. The thickness of the resin layer is preferably set in a range of 0.1 to 2 mm, more preferably a range of 0.1 to 1 mm, further more preferably a range of 0.1 to 0.5 mm because thin thickness can reduce the strain caused by a load in use.

As the material of the metal base, a melt-cast metal is preferable from a viewpoint of strength. Iron-based, aluminum-based, or copper-based melt-cast metal is more preferable. Examples of the iron-based melt-cast metal include carbon steel for general structures (SS400, etc.), carbon steel for mechanical structures (S45C, etc.), and stainless steel (SUS303, SUS316, etc.). Any of these iron-based melt-cast metals plated with zinc, nickel, copper or the like may be also adopted.

Examples of the aluminum-based melt-cast metal include A1050, A1100 and aluminum alloys such as A2017, A2024, A5056 and A6061. A2017 or A2024 is preferable because of its superior processability.

Examples of the copper-based melt-cast metal include C1100 and copper alloy such as C3604. C6801 or C6802 of which a lead content of 0.1% or less and a cadmium content of 0.0075% or less is preferable from a viewpoint of processability and environment concerns.

Abase resin of the resin layer in the insulating bushing is not especially limited. Examples of the base resin include a PEK-based resin, a polyacetal resin, a PPS resin, an injection-moldable thermoplastic polyimide resin, an injection-moldable thermoplastic polyamide-imide resin, an injection-moldable thermoplastic polyamide resin, an injection-moldable fluororesin, and an injection-moldable PTFE resin. Any one of these synthetic resins may be adopted alone, or a polymer alloy compounding more than two of them may be adopted. It is preferable that the resin layer has chemical resistance because the resin layer is used in a condition exposed to the refrigerant or the lubrication oil. Specifically, as the base resin of the resin layer, a PEK-based resin, a PPS resin, a PFA resin, an FEP resin, an ETFE resin or a PTFE resin is preferably adopted. Examples of the PEK-based resin include a polyether ether ketone (PEEK) resin, a polyether ketone (PEK) resin, and a polyether ketone ether ketone ketone (PEKEKK) resin.

An additive may be appropriately compounded to the resin layer. As the additive, for example, a non-conductive reinforcing material such as glass fiber, aramid fiber, calcium titanate whisker, and titanium oxide whisker is preferably compounded for improving creep resistance. Further, it is preferable that the resin layer does not contain any conductive additives.

As one aspect of the specific resin layer, it is preferable that a PTFE resin, which is superior in chemical resistance, is adopted as the base resin, and glass fiber is adopted as the additive. The resin layer preferably contains 10 to 30 mass % of the glass fiber relative to the whole of the resin layer.

The insulating rolling bearing shown in FIG. 3 can be obtained by, for example, the following method. First, a resin sheet having a thickness of 0.5 mm formed by compounding glass fiber into a PTFE resin is bonded onto a surface of a steel plate such as SPCC having a thickness of 1 mm. The bonding surface of the metal base is preferably roughened by a surface roughening treatment. The roughened surface of the metal base allows the resin layer (including the resin sheet) to strongly adhere thereto by an anchoring effect. Examples of the surface roughening treatment include a mechanical surface roughening method such as a shot blast method, an electrical surface roughening method such as a glow discharge treatment and a plasma discharge treatment, and a chemical surface roughening method such as an alkali treatment described below. After cutting a composite plate of the metal base and the synthetic resin sheet into a rectangular shape having a specified size, the composite plate is bent in a cylindrical shape such that the resin sheet is located at an inner side thereof, so that a rolled bushing (the insulating bushing) is obtained. In this manner, the insulating bushing shown in FIG. 3 is a rolled bushing formed by rolling the metal plate coated with the synthetic resin, into a cylindrical shape.

The resin layer of the insulating bushing is not limited to a configuration formed by the resin sheet but may be formed by coating and drying or by injection-molding a melted resin composition on a surface of the metal base.

The obtained insulating bushing is press-fitted into the inner peripheral portion of the inner ring of the rolling bearing so as to obtain the insulating rolling bearing shown in FIG. 2. A press-fitting allowance between the insulating bushing and the inner ring is, for example, 10 to 60 µm, preferably 20 to 50 µm. In a case in which the press-fitting allowance is less than 10 µm, the inner ring and the insulating bushing might rotate relative to each other in response to the rotation of the shaft. Further, in a case in which the press-fitting allowance is more than 60 µm, the roundness of the raceway surface of the inner ring might be deteriorated.

In the following description, in particular, an example in which the resin layer of the insulating bushing is an injection-molded layer is described.

Figure 5:
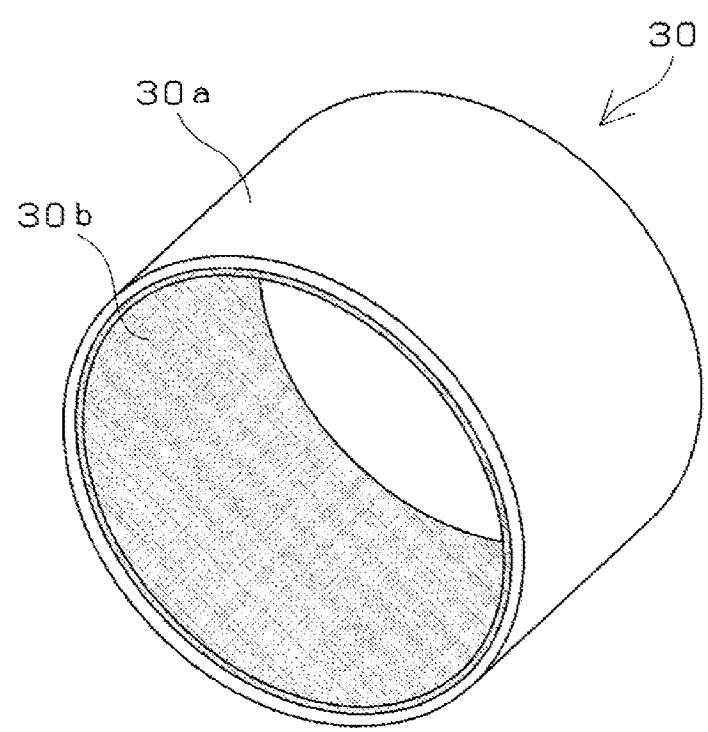
FIG. 5 is a perspective view illustrating another example of an insulating bushing of the insulating rolling bearing of the present invention.

FIG. 5 is a perspective view illustrating one example of the insulating bushing. As shown in FIG. 5, an insulating bushing 30 is a generally cylindrical member and has a generally cylindrical metal base 30a, and a resin layer 30b, which is an injection-molded layer, formed on an inner peripheral surface of the metal base 30a. The insulating bushing 30 is obtained through insert-molding that arranges the metal base 30a in an injection-molding mold and injection-molds a specified synthetic resin into the injection-molding mold. With the insert-molding, the insulating bushing 30 is realized that the metal base 30a and the resin layer 30b are strongly integrated.

In the process of arranging the metal base into the injection-molding mold and injection-molding the synthetic resin, a small clearance is necessary between the molding mold and an outer peripheral portion of the metal base for arranging and releasing the metal base into/from the molding mold. However, when the synthetic resin is injection-molded, the injection-molding pressure is applied to the inner peripheral portion of the metal base. Accordingly, in a case in which the clearance is formed at the side of the outer peripheral portion of the metal base, the metal base expands outward. At this time, in a case in which the tensile elongation at break of the metal is too small, the metal base might be broken through the injection-molding. Thus, the material of the metal base is preferably a melt-cast metal having the tensile elongation at break of 5% or more. The materials such as aluminum alloy die-casting, aluminum alloy casting and copper alloy casting each having the tensile elongation at break of less than 5% are not suitable to the material of the metal base.

It is preferable that the bonding surface of the metal base to the resin layer is roughened by shot blast, tumbler, machining, or the like for enhancing the adhering strength between the metal base and the resin layer. The surface roughness thereof is preferably Ra 4 µm or more.

In particular, in order to enhance the adhesiveness between the metal base and the resin layer, it is preferable to apply the chemical surface treatment to the bonding surface of the metal base to the resin layer. As the chemical surface treatment, (1) a treatment for forming a fine unevenness on the bonding surface, or (2) a treatment for forming a bonding film, which chemically reacts with the resin layer, on the bonding surface is preferably adopted.

By forming the fine unevenness on the bonding surface, the actual bonding area is increased, and thus the adhering strength between the metal base and the resin layer is further enhanced. By forming the bonding film, which chemically reacts with the resin layer, on the bonding surface, the adhering strength between the metal base and the resin layer is further enhanced.

An example of the surface roughening treatment for forming the fine unevenness includes a method of melting the inner peripheral surface of the metal base by an acid solution treatment (sulfuric acid, nitric acid, hydrochloric acid, etc. or a mixture with other solution) or an alkali solution treatment (sodium hydroxide, potassium hydroxide, etc. or a mixture with other solution). The fine unevenness depends on the density, the time of treatment, the after-treatment or the like, however it is preferable to form the fine unevenness of which the pitch of recesses is several nanometers to dozens of micrometers for enhancing the adhesiveness caused by the anchoring effect. Further, examples other than a general acid solution treatment and a general alkali solution treatment include a special treatment such as an amalpha treatment by MEC Company LTD. and an NMT (Nano Molding Technology) treatment by Taisei Plus Co., Ltd.

In a case in which the resin layer is formed by the injection-molding, since the resin material is poured into the molding mold at high speed, the resin material is capable of entering into the fine unevenness of which the pitch of recesses is several nanometers to dozens of micrometers by shear force. This configuration can secure the adhering strength between the metal base and the resin layer. Further, the fine unevenness formed by the chemical surface treatment has a complex three-dimensional structure such as porous structure, which is different from the surface configuration that is merely mechanically roughened. Accordingly, the fine unevenness formed by the chemical surface treatment can show the anchoring effect easily and thus the strong adhering can be obtained.

An example of the surface treatment for forming the bonding film that chemically reacts with the resin layer includes an immersing treatment into a solution of a triazine dithiol derivative or an s-triazine compound. In such a surface treatment, the bonding film reacts with the resin material by heat and pressure when arranging the treated metal base into the molding mold and performing the injection-molding, so that the adhesiveness between the resin layer and the metal base is enhanced. An example of such a surface treatment includes a TRI treatment by TOAD-ENKA Co., LTD.

Of these chemical surface treatments, the special surface treatments such as the amalpha treatment by MEC Company LTD., the NMT treatment by Taisei Plus Co., Ltd., and the TRI treatment by TOADENKA Co., LTD. are suitable to aluminum and copper. Accordingly, when any of such treatments is applied, it is preferable that at least the inner peripheral surface of the metal base is formed of aluminum or copper.

The shear bonding strength between the metal base and the resin layer is preferably 2 MPa or more. Within this range, sufficient adhering strength can be obtained in use, and the resin layer is prevented from peeling from the metal base even in the use under a high load. Further, the shear bonding strength is more preferably 4 MP or more in order for applying higher safety factor. A combination of appropriately selected means for enhancing the adhesiveness such as a physical fixing, a mechanical surface roughening treatment and a chemical surface roughening treatment may be preferably adopted for securing the shear bonding strength.

In a case in which the resin layer is an injection-molded layer, an injection-moldable synthetic resin is adopted as a base resin. As the injection-moldable synthetic resin, a PPS resin, a PEK-based resin, a PFA resin, an FEP resin or an ETFE resin is preferably adopted because of its superior chemical resistance and superior heat resistance.

As one aspect of the specific resin layer, it is preferable that the PPS resin is adopted as the base resin and glass fiber is adopted as the additive. The resin layer preferably contains 10 to 30 mass % of the glass fiber relative to the whole of the resin layer.

The insulating bushing shown in FIG. 5 is formed by, for example, the following method. First, a metal pipe is cut into a cylindrical body (the metal base) having a thickness of 1 mm, and the chemical surface treatment is applied to an inner peripheral surface of the cylindrical body. Thereafter, the cylindrical body is arranged in the molding mold, and the resin layer is formed on the inner peripheral surface of the cylindrical body by means of injection-molding. It is preferable that the resin layer having a specific thickness is formed by the injection-molding. However, since the clearance is formed between the molding mold and the metal base as described above, the thickness of the resin layer relative to the metal base might become ununiform. In such a case, the resin layer is machined using a lathe to be coaxial with the metal base, and thereby the resin layer having the uniform thickness is obtained.

Figure 6:
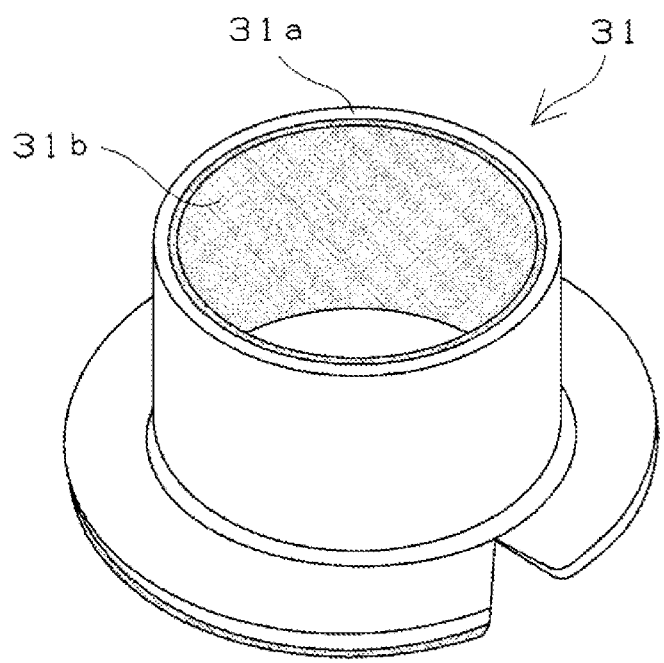
FIG. 6 is a perspective view illustrating the other example of an insulating bushing of the insulating rolling bearing of the present invention.

FIG. 6 shows the other example of the insulating bushing. An insulating bushing 31 shown in FIG. 6 has a cylindrical metal base 31a having a flange, and a resin layer 31b formed on an inner peripheral surface of the metal base 31a. In a case in which the insulating bushing 31 is fitted into the inner peripheral portion of the inner ring, the flange is fitted to the width surface of the inner ring so that the metal base 31a abuts on the width surface. In the configuration of the insulating bushing 31, for example, a gate for the injection-molding is disposed to correspond to the flange, so that a gate mark (protrusion) formed when cutting the gate is prevented from protruding from a contact surface with the shaft.

As described above, in a case in which the insulating rolling bearing of the present invention is used in the refrigerant compressor shown in FIG. 1, the insulating bushing is fitted into the inner peripheral portion of the inner ring, however the insulating rolling bearing of the present is not limited to this. For example, in a case in which the bearing having a rotatable outer ring is used in the refrigerant compressor, the insulating bushing may be fitted onto an outer peripheral portion of the outer ring. In this case, the insulating bushing is fitted onto the outer peripheral portion of the outer ring such that the metal base abuts on the outer peripheral portion of the outer ring and the resin layer serves as an outer peripheral surface of the insulating rolling bearing.

In the example shown in FIGS. 1 and 2, the ball bearing is exemplarily described as the insulating rolling bearing of the present invention, however the insulating rolling bearing of the present invention may be applied to a tapered roller bearing, a cylindrical roller bearing, a self-aligning roller bearing, a needle roller bearing, a thrust cylindrical roller bearing, a thrust tapered roller bearing, a thrust needle roller bearing, a thrust self-aligning roller bearing, or the like.

The configuration of the refrigerant compressor is not limited to the example shown in FIG. 1. For example, an oil pump that is connected to an oil reservoir may be disposed on an end portion of the shaft 5 shown in FIG. 1 and an oil passage may be formed to penetrate the shaft 5 in the axial direction. According to this configuration, the oil (refrigerator oil) in the oil reservoir is supplied to the oil passage using the oil pump, so that the slewing bearing, the main bearing, and the sub bearing can be lubricated.

INDUSTRIAL APPLICABILITY

The insulating rolling bearing of the present invention can be widely used as an electrolytic corrosion preventive bearing that is capable of preventing the electrolytic corrosion and preventing a gap from being undesirably formed between the shaft and the raceway ring.

REFERENCE SIGNS LIST

- 1: compressor
- 2: fixed scroll
- 3: center housing
- 4: motor housing
- 5: shaft
- 6: balance weight
- 7: movable scroll
- 8: slewing bearing
- 9: sleeve
- 10: compression chamber
- 11: stator
- 12: rotor
- 13: discharge chamber
- 14: motor chamber
- 15: seal ring
- 16: low pressure chamber
- 17: space
- 18: main bearing
- 21: sub bearing (insulating rolling bearing)
- 22: inner ring
- 23: outer ring
- 24: ball
- 25: cage
- 26: sealing member
- 27: grease
- 28: insulating bushing
- 29: insulating bushing
- 30: insulating bushing
- 31: insulating bushing

The invention claimed is:

1. An insulating rolling bearing comprising:
an inner ring;
an outer ring;
rolling elements that are interposed between the inner ring and the outer ring; and
an insulating bushing that is fitted to an inner peripheral portion of the inner ring or an outer peripheral portion of the outer ring,
wherein:
the insulating bushing consists of a generally cylindrical metal base, and a resin layer formed on an inner peripheral surface or an outer peripheral surface of the metal base, and
the insulating bushing is fitted to the inner peripheral portion of the inner ring or the outer peripheral portion of the outer ring such that the metal base abuts on the inner peripheral portion of the inner ring or the outer peripheral portion of the outer ring, and
the insulating bushing is (A) a bushing that is fitted to the inner peripheral portion of the inner ring and is formed by the metal base on the outer diameter side and the resin layer on the inner diameter side, or (B) a bushing that is fitted to the outer peripheral portion of the outer ring and is formed by the metal base on the inner diameter side and the resin layer on the outer diameter side.

2. The insulating rolling bearing as defined in claim 1, wherein the insulating bushing is a rolled bushing having one cut part in a circumferential direction.

3. The insulating rolling bearing as defined in claim 1, wherein a base resin of the resin layer is a polytetrafluoroethylene resin.

4. The insulating rolling bearing as defined in claim 1, wherein the resin layer contains 10 to 30 mass % of glass fiber relative to a whole of the resin layer.

5. The insulating rolling bearing as defined in claim 1, wherein:
the insulating bushing is the bushing of (A) and the resin layer is an injection-molded layer formed on the inner peripheral surface of the metal base.

6. The insulating rolling bearing as defined in claim 5, wherein a base resin of the resin layer is a polyphenylene sulfide resin, a polyether ketone-based resin, a tetrafluoroethylene-perfluoroalkyl vinyl ether copolymer resin, a tetrafluoroethylene-hexafluoropropylene copolymer resin, or a tetrafluoroethylene-ethylene copolymer resin.

7. The insulating rolling bearing as defined in claim 1, wherein a bonding surface of the metal base to the resin layer is subjected to a chemical surface treatment that enhances adhering force of the resin layer.

8. The insulating rolling bearing as defined in claim 7, wherein the chemical surface treatment forms a fine unevenness on the bonding surface or forms a bonding film, which chemically reacts with the resin layer, on the bonding surface.

9. The insulating rolling bearing as defined in claim 1 configured to be used as a bearing in a refrigerant compressor to rotatably support a shaft rotationally driven by a motor of the refrigerant compressor.

10. The insulating rolling bearing as defined in claim 9, wherein the refrigerant compressor is a scroll type refrigerant compressor.

* * * * *